E. BRIGGS.
Cultivator.
No. 29,136.
Patented July 17, 1860.
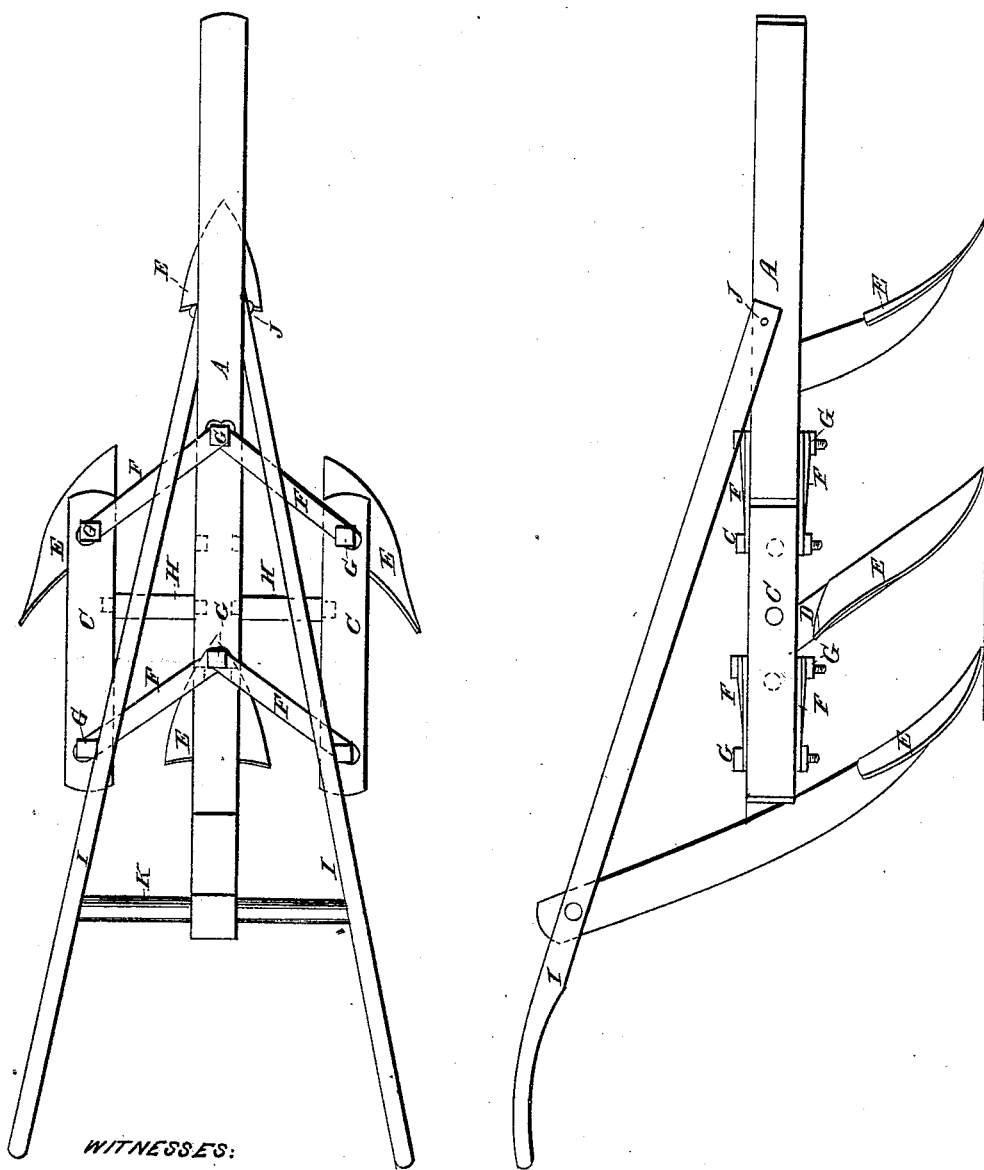
WITNESSES:
INVENTOR:
Ephraim Briggs

UNITED STATES PATENT OFFICE.

EPHRAIM BRIGGS, OF MEDINA, OHIO.

IMPROVEMENT IN CULTIVATORS.

Specification forming part of Letters Patent No. 29,136, dated July 17, 1860.

*To all whom it may concern:*

Be it known that I, EPHRAIM BRIGGS, of Medina, Medina county, State of Ohio, have invented a new and Improved Mode of Shifting and Changing Cultivator-Shovels; and I do declare that the following is a full and exact description thereof, reference being had to the accompanying drawings, and to letters of reference marked thereon.

A is the main beam; C C, the side beams or wings, into which the angular posts D D D D are mortised.

E E E E are the shovels. The side shovels are made in the form of a mold-board, and by the use of the bars F F F F F F F F, lying at an angle with the beams, and connecting thereto by the bolts G G G G G G, thus forming a joint, they may be expanded or contracted by moving them backward or forward without altering their parallel position.

H H are braces, which are kept in their places by the draft. By the use of braces of different lengths the operator may make the cultivator of any width he may desire. By removing the four outside bolts the outside beams and shovels may be reversed and the cultivator used when the corn is small without covering or hilling up. By reversing them the operator can hill it up as he may desire.

I I is the handle, which is fastened to the beam in front by the bolt J, and at the hind end by the post running up with the round K, passing through the end of it and through the handles.

What I claim as my invention, and wish to secure by Letters Patent, is—

The arrangement of the main beam A and the side beams or wings, C C, the posts D D D D, the shovels E E E E, bars F F F F, bolts G G G G G G, changeable braces H H, handles I I, and round K, in manner and for the purpose as set forth.

EPHRAIM BRIGGS.

Witnesses:
WM. M. McCAULEY,
G. C. ASHTON.